United States Patent [19]

Gersbach et al.

[11] Patent Number: 5,668,709

[45] Date of Patent: Sep. 16, 1997

[54] SWITCHED CAPACITOR CURRENT SOURCE

[75] Inventors: John Edwin Gersbach, Burlington; Masayuki Hayashi, Williston, both of Vt.

[73] Assignee: International Business Machine Corporation, Armonk, N.Y.

[21] Appl. No.: 398,395

[22] Filed: Mar. 2, 1995

[51] Int. Cl.$^6$ .................................................. H02M 3/18
[52] U.S. Cl. .................................................. 363/60
[58] Field of Search ...................... 363/59, 60; 323/282, 323/284, 312, 313; 327/28–30, 44

[56] References Cited

U.S. PATENT DOCUMENTS

| | | | |
|---|---|---|---|
| 4,302,804 | 11/1981 | Bader | 363/60 |
| 4,374,357 | 2/1983 | Olesin et al. | 323/351 |
| 4,621,315 | 11/1986 | Vaughn et al. | 363/60 |
| 4,742,292 | 5/1988 | Hoffman | 323/314 |
| 4,849,661 | 7/1989 | Bazes | 307/475 |
| 4,999,761 | 3/1991 | Bingham et al. | 363/60 |
| 5,051,882 | 9/1991 | Grimm et al. | 363/60 |
| 5,408,174 | 4/1995 | Leonowich | 323/315 |
| 5,467,010 | 11/1995 | Quarmby et al. | 323/284 |
| 5,475,337 | 12/1995 | Tatsumi | 327/551 |

*Primary Examiner*—Matthew V. Nguyen
*Attorney, Agent, or Firm*—Thornton & Thornton

[57] ABSTRACT

A switched capacitor, integrated circuit employing at least one non-linear capacitor charged and discharged in response to a reference frequency includes a first conductive device for charging the non-linear capacitor to the supply voltage in response to one polarity of the reference frequency, and a second conductive device for discharging the non-linear capacitor in response to the opposite polarity of the reference frequency to a voltage level opposite that of the voltage source minus the threshold voltage of a third conductive device in the discharge path. Preferably, a pair of non-linear capacitors are employed, each being charged on alternate half cycles of the reference frequency, and the non-linear capacitors are accumulator capacitors. The circuit also include means for rapidly initiating the charging and discharging of said capacitors and for precluding changes in the state of charge or discharge thereof due to parasitic diodes in the circuit.

9 Claims, 3 Drawing Sheets

5,668,709

1

SWITCHED CAPACITOR CURRENT SOURCE

FIELD OF THE INVENTION

The present invention generally relates to current sources for integrated circuits and more particularly to switched capacitor current sources.

BACKGROUND OF THE INVENTION

The provision of effective current sources in integrated circuits is complicated by processing restrictions inherent in circuit construction. Switched capacitor circuits, however, can provide a current source which is compatible with integrated circuit processing. An example of a switched capacitor circuit is described in U.S. Pat. No. 4,374,357 which utilizes a pair of FET capacitors, charged and discharged on alternate half cycles of a reference frequency to produce a DC current source. Typically, circuits of this type employ linear capacitors which, due to variations in threshold voltage, result in alterations in the produced current. Further, these capacitors often provide a restricted range of the charge and discharge levels.

SUMMARY OF THE INVENTION

An object of the present invention is to provide an improved current source.

Another object of the present invention is to provide an improved integrated circuit current source.

A further object of the present invention is to provide an improved switched capacitor current source.

A still further object of the present invention is to provide a switched capacitor, current source having a predictable output current.

These desirable results and other objects are realized and provided by a switched capacitor circuit employing at least one non-linear capacitor charged and discharged responsive to a reference frequency. Preferably, the circuit of the invention includes at least one non-linear capacitor, a first conductive device for charging the non-linear capacitor from a given source of voltage in response to the reference frequency, and a second conductive device through which the non-linear capacitor is discharged to a voltage level opposite that of the voltage source minus the threshold voltage of the second conductive device. In the preferred embodiment, the circuit is an FET integrated circuit, a pair of non-linear capacitors are employed, each being charged on alternate half cycles of the reference frequency, and the non-linear capacitors are accumulator capacitors.

DESCRIPTION OF THE PREFERRED EMBODIMENT

Figure 1:
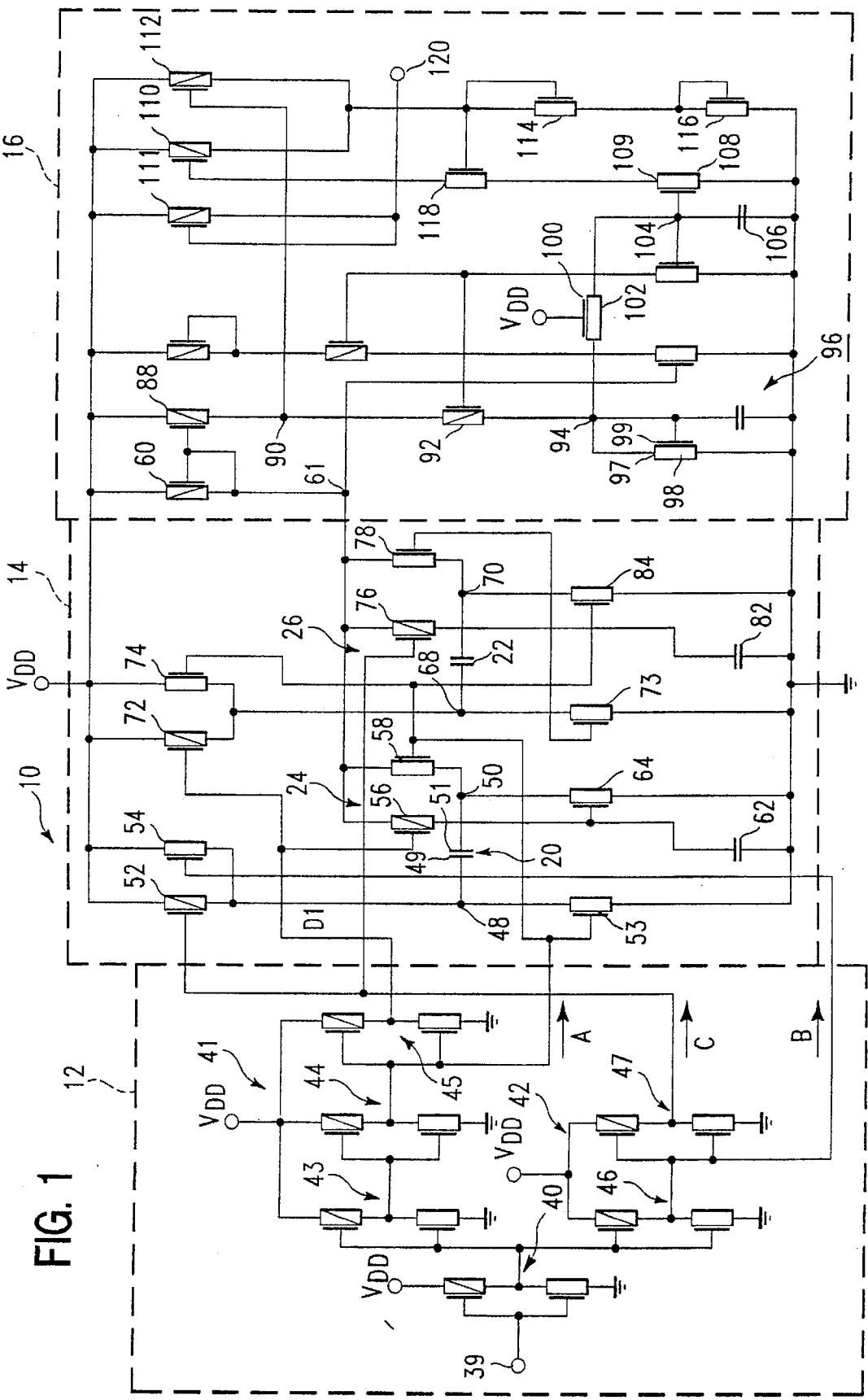
FIG. 1 is a schematic diagram of a switched capacitor current source constructed in accordance with the invention.

In the preferred embodiment, as illustrated in FIG. 1, the invention comprises an integrated circuit current source 10

2 made up of FET devices, and consists of three sections, a waveform generator 12, a switched capacitor circuit 14 and a filter network 16.

As will later be explained in detail, the switched capacitor circuit 14 includes a pair of identical non-linear capacitors 20 and 22, respectively coupled to identical charge/discharge networks 24 and 26, with each capacitor contributing to the produced current on alternate half cycles.

In prior art FET circuits, conventional FET capacitors are employed. These capacitors, or so called inversion capacitors, require the inversion of their channel prior to any accumulation of charge, and result in a rather linear voltage/capacitance curve as demonstrated in FIG. 3.

Such capacitors include a gate, a thin oxide, a channel, and a diffusion at each end of the channel. Typically, a P-type FET capacitor would have a P-type channel in an N substrate with diffusions at each end of the channel tied together to form one electrode of the capacitor, and the gate forming the other. During charging, the P-type channel must become inverted in order in order to form a capacitance from gate to channel. Consequently, the capacitance is limited, and also, these capacitors exhibit a relatively linear charging curve as shown at 27 in FIG. 3.

Unfortunately, the threshold voltage of such FET capacitors will vary as a function of the processing used to form the device, and as a result of the slope of the charging curve, any variation in threshold voltage of such capacitors will produce considerable variation in the capacitance achieved. Thus, switched capacitor, DC current sources using linear capacitors have a first order dependance on the threshold voltage which can result in significant variation from wafer to wafer of the magnitude of the produced current. Further, this variation requires a large capacitance to filter the charge packets that make up the current stream.

Figure 3:
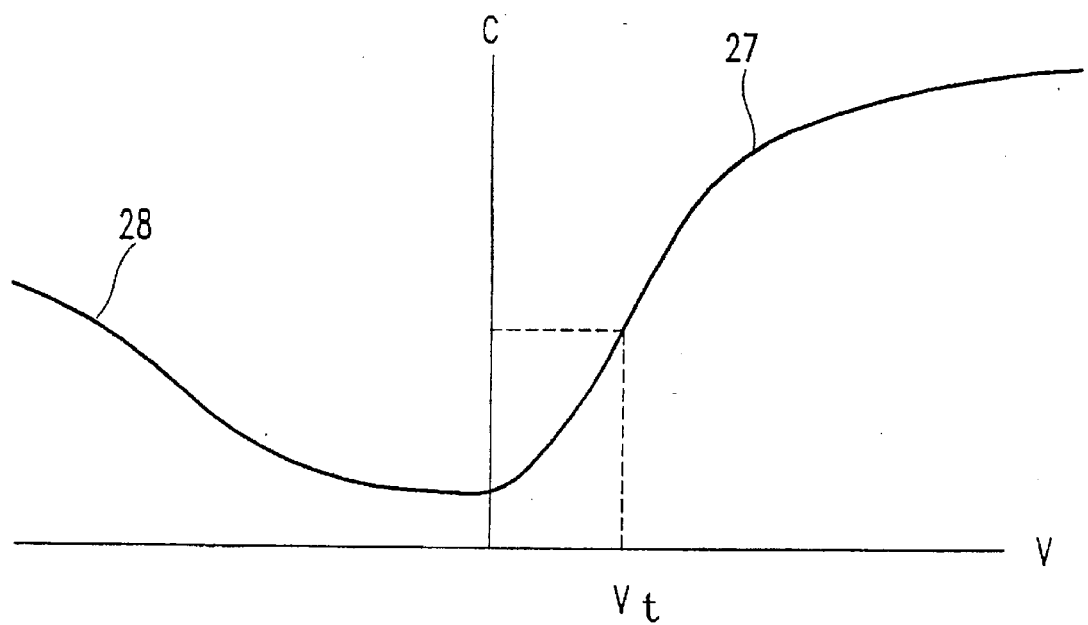
FIG. 3 is a diagram of the voltage versus capacitance curve of the linear capacitors commonly employed in prior art circuits.

A second disadvantage is that the voltage on the inversion capacitor will also ride up again during discharge, as illustrated at 28 in FIG. 3. The latter, in turn, limits the total range of the voltage swing on the capacitor.

Figure 4:
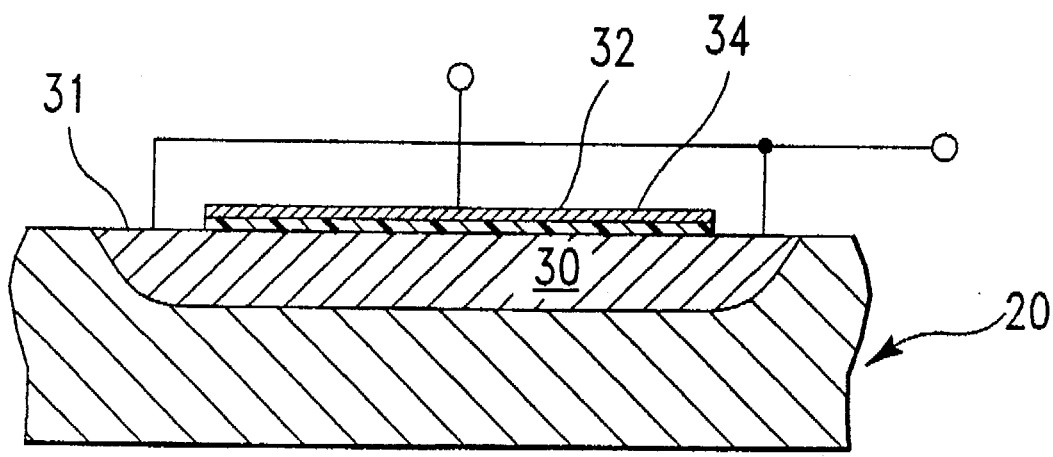
FIG. 4 is a sectional view of one of the non-linear capacitors employed in the circuit of FIG. 1.

These disadvantages are substantially attenuated in the inventive arrangement by utilizing a non-linear capacitor, such as the capacitor 20, illustrated in the FIG. 4. In this arrangement, an N-type FET is formed in an N well 30. A thin oxide layer 32 and an overlying gate 34 are formed on the upper surface 31 of the well 30, and a common connection is made at each end of this well to form one electrode of the capacitor, with the gate 32 forming the other. Consequently, the capacitor 20, unlike an inversion capacitor, has no channel requiting inversion. There is no need to invert the surface 31, since it remains N. The capacitor begins to immediately accumulate charge, and thus, may be called an accumulation capacitor.

Hence, this structure results in a capacitor whose capacitance is non-linear with respect to the voltage applied between the gate and the source-drain, which in this arrangement is the N-well itself. When the voltage is above 0.8 volts, the effective capacitance of this device approaches that of the thin oxide but falls off rapidly as the voltage is reduced. The tolerance of the current from the current source 10 benefits from this characteristic.

Figure 5:
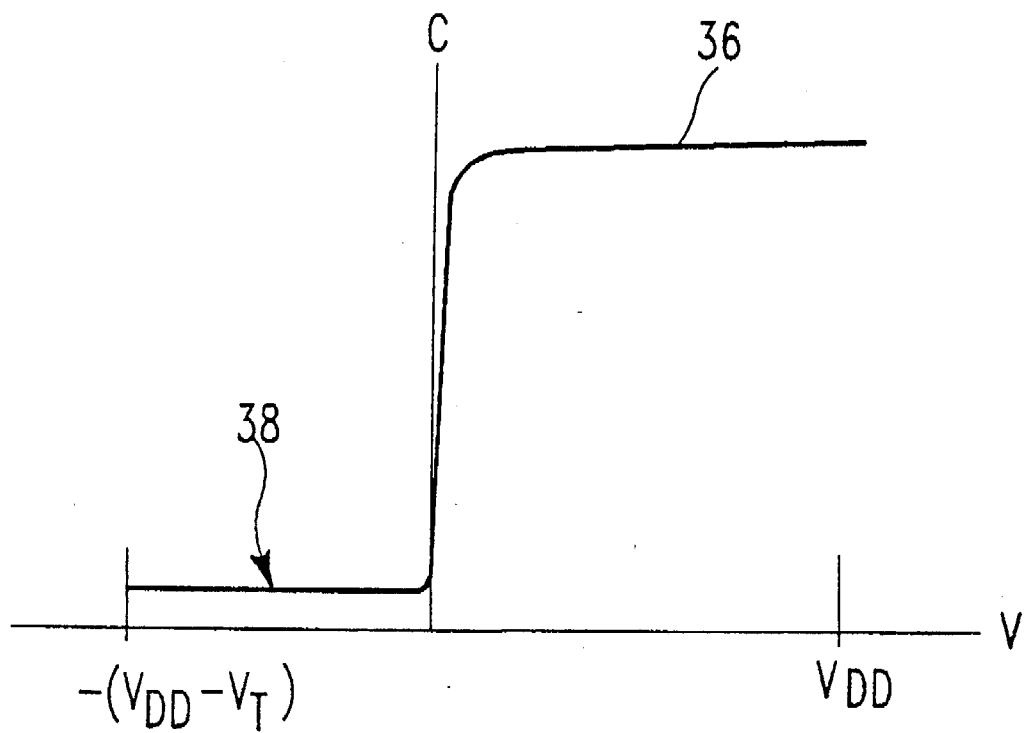
FIG. 5 is a diagram of the voltage versus capacitance curve of the non-linear capacitor illustrated in FIG. 4.

A typical voltage versus capacitance curve for the capacitor 20 is illustrated in FIG. 5. As shown therein, the voltage rises very rapidly in a non-linear fashion upon charging, and additionally drops to a constant, low voltage level upon discharge. Although there will still be a variation in the threshold voltage between differently processed capacitors of this type, any such variation will have a considerably reduced effect on the capacitance.

Additionally, in contrast to the prior art inversion capacitor, the non-linear capacitors 20, 22 can be discharged all the way back to the opposite polarity from the direction in which the initial charge was made. That is, as later explained with regard to the operation of the circuit, the capacitors 20, 22 are charged in the forward direction all the way up to the supply, Vdd and then discharged in the opposite direction all the way back to the supply voltage minus the threshold voltage of one of a conductive device through which the capacitor 20 is discharged.

Now, in switched capacitor circuits employing inversion capacitors, there is a first order dependance upon the threshold voltage of the capacitor. With the non-linear capacitor of the inventive circuit, however, such dependance is reduced by one fourth, and is actually reduced to dose to 20% of the threshold variation.

The current in prior art switched capacitor circuits is defined by the following equation:

$$I=C*F*(V2-V1)$$

where C is the capacitance, F is the frequency and V1 and V2 are the voltage levels before and after switching the current stream.

For calculation of the current, in the inventive circuit employing non-linear capacitors, a simplifying assumption is that the capacitance value is C at zero volts and above, and C/4 below zero volts. Then, the current equation for the current source 10 is:

$$I=F*(C*Vdd)-C/4*(Vdd-Vt/4)=F*C*(1.25Vdd-Vt/4)$$

Where C is the capacitance value above 0.8 volts, Vdd is the supply voltage and Vt is the threshold value of the discharging transistor. It is to be understood that the latter equation is only valid because of the non-linearity of these capacitors.

As can be seen from an inspection of the latter equation, the threshold term is divided by four. Thus, while the threshold voltage of the capacitor is not eliminated as a consideration, it is attenuated by a factor of four, and as compared to circuits employing conventional capacitors, it will have ¼ of the effect.

Turning now to the waveform generator 12, it is to be first noted that it is a generally conventional network designed in this instance, to produce four waveforms, A, B, C and D (illustrated in FIG. 2) for input to the switched capacitor circuit 14. The waveforms A–D are the timing signals particularly designed for driving the charge/discharge networks 24 and 26.

The generator 12 employs a plurality of CMOS inverters to provide the waveforms A to D. In this arrangement, a first inverter 40 drives two inverter sections 41 and 42, and a reference frequency, designated REF is entered into the inverter 40 (and the generator 12) at an input terminal 39. The inverter section 41 comprises three interconnected inverters 43, 44 and 45 which, in response to the reference signal, produce waveforms A and D, whereas the inverter section 42 includes a pair of inverters 46 and 47 which produce the waveform B and C.

Figure 2:
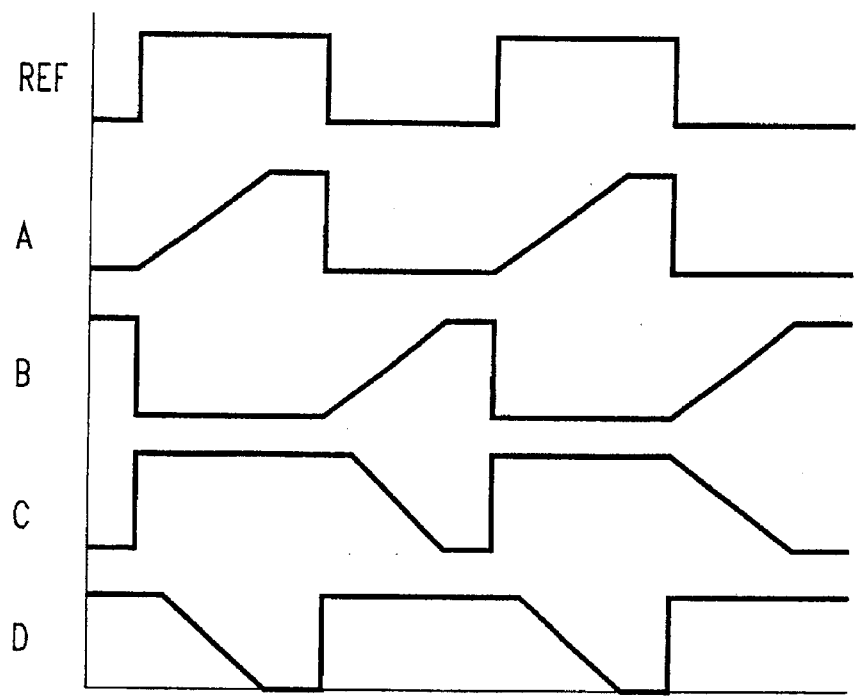
FIG. 2 is a timing diagram of selected waveforms generated in the circuit of FIG. 1.

As shown in FIG. 2, the waveform A which is the output of the inverter 44, ramps up in a positive manner in accordance with the positive half cycle of the reference signal. Conversely, the waveform B which is the output from the inverter 45, ramps up in a positive manner in accordance with the negative half cycle of the reference signal.

Similarly, the waveform C is positive when the reference signal is positive, and the waveform D is positive when the reference signal is negative. The waveforms C and D ramp downward as illustrated in this figure and, as explained below, are also delayed with respect to the waveforms A and B, respectively.

Now, it is important to charge the capacitors 20, 22 slowly enough to avoid transient noise. Consequently, the waveform generator 12 is designed so that the slowest portion of the charge/discharge networks 24, 26, will just have time to charge its associated capacitor to its final value. To this end, the generator 12 is designed in a conventional manner to provide a slow ramp up of the waveforms A and D, as illustrated in FIG. 2.

Also, for efficient discharge of each of the capacitors 20, 22, a circuit delay is provided for the waveforms C, D so that, as later explained in detail, the transistors that bring a given capacitor to its final value are turned completely off prior to turning on the discharging transistors. To this end, the waveform D is delayed with respect to the waveform A in accordance with the design of the inverter 45 with respect to its input from the inverter 44. Similarly, the waveform C is delayed with respect to waveform B in accordance with the design of the inverter 47.

Turning now to the charge/discharge network 24, it can be seen in FIG. 1 that the capacitor 20 is connected between the circuit nodes 48 and 50. For charging of this capacitor, the voltage source, Vdd, is connected to the node 48 through a pair of transistors, a P-type transistor 52 and an N-type transistor 54. Completing this charge path, the node 50 is coupled, in turn, to ground through an N-type transistor (64. To provide effective discharge of the capacitor 20, a pair of transistors 56 and 58, a P-type and an N-type transistor are connected in parallel between the node 50 and the voltage source Vdd through a P-type transistor 60 of the filter network 16. In turn, the node 48 is coupled to ground through an N-type transistor 53.

In the charge/discharge network 26 which is essentially identical to the charge/discharge circuit 24, the capacitor 22 is connected between a pair of circuit nodes 68 and 70. For charging the capacitor 22, the voltage source Vdd is coupled to the node 68 through a parallel pair of transistors, namely, a P-type transistor 72 and an N-type transistor 74. To complete this charging path, the node 70 is coupled to ground through an N-type transistor 84.

In the discharge path for the capacitor 22, the node 70 is connected through a pair of parallel transistors 76 and 78 (P-type and N-type transistors, respectively) to a node 61 of the filter network 16, which is connected to the voltage supply Vdd through the transistor 60. In turn, the node 68 is coupled to ground through an N-type transistor 73.

To assist in explaining the switched capacitor operation, the charge and discharge paths of the capacitors 20 and 22 will first be described. The charge path for the capacitor 20 is from the supply Vdd down through the transistor 52 and 54 to the node 48 and through the capacitor 20 to the node 50. The current path is then completed from the node 50 to ground through the transistor 64.

On the other hand, during discharge, the current path is from the supply through the transistor 60 to the node 61, and from it through the transistor 56 and 58 to the node 50. It then passes through the capacitor 20, in the reverse direction, to the node 48 and from it to ground by way of the transistor 53.

As is to be expected, the current paths for the capacitor 22 are very similar to the above, and thus, the charging current passes through the transistor 72 and 74 to the node 68, from it through the capacitor 22 to the node 70 and then to ground through the transistor 84. In similar fashion to that of the capacitor 20, the discharge path for the capacitor 22 is through the transistor 60 to the node 61 and from it through the transistor 76 and 78 to the node 70. It then continues through the capacitor 22 to the node 68 and to ground via the transistor 73.

Prior to describing a complete charge/discharge cycle, the connections of the waveforms A–D to the switched capacitor network 14 will be described. As can be seen in FIG. 1, the waveform A is connected to the transistors 53 and 58 in the charge/discharge circuit 24 and also to the transistors 74 and 84 in the charge/discharge circuit 26. On the other hand, waveform B is connected to the transistors 54, 64 in the charge/discharge circuit 24 and also to the transistors 73 and 78 in the charged/discharge circuit 26. The waveform C is coupled to the transistors 52 and 76, respectively, in the charged/discharge circuits 24 and 26, whereas the waveform D is connected to the transistors 56 and 72 of these circuits, respectively.

In describing a charged/discharge cycle for the capacitor 20, it is convenient to start with the capacitor at full charge, just prior to initiation of its discharge. At this point in the cycle, the node 48 would be at the supply voltage Vdd, the node 50 at ground, and the relative values of the waveforms A–D would conform to that shown at the left hand edge of the timing diagram of FIG. 2.

Consequently, the waveform A would be negative but ready to start ramping up positive at the positive transition of the reference signal while waveform B would be positive and about ready to drop sharply negative. Waveform C would be negative at this time but ready to sharply turn positive. Finally, the waveform D would be positive and remain at that polarity for a short delay following the reference signal transition, after which the waveform D will ramp down to its negative value.

At the transition of the reference signal to its positive polarity, the charging of the capacitor 20 ends, and after a slight delay, its discharge begin. With regard to the latter, it is important to make sure that the transistor 52 and 54 (which are holding node 48 to Vdd) and the transistor 64 (which is holding node 50 to ground) are completely off before turning on the transistors 53, 56 and 58 to initiate discharging. As explained immediately below, the ramping and delay aspects of the waveforms provide this effect.

At the transition, the waveform A, which will ultimately turn the transistors 53 and 58 on, is just starting to ramp up and waveform B would be all the way down so as to completely shut off the transistors 54 and 64. In turn, waveform C would be all the way up thereby shutting off the transistor 52. Finally, the waveform D would remain positive for a short delay to hold the transistor 56 in its off mode.

Once the delay is completed, waveform D begins to ramp negative so as to slowly turn transistor 56 on. The transistors 53 and 56 will have started to turn on just prior to this point due to the ramp up of the waveform A and D. Thus the capacitor 20 will begin to discharge through the transistor 60.

Then, as this half cycle is completed just prior to the transition of the reference signal negative, the capacitor 20 has become completely discharged all the way back to the supply voltage minus the threshold voltage of the transistor 60 or that is, to Vdd-Vt; where Vt is that of transistor 60. At this point, the node 48 will be at ground and the node 50 will be at the voltage of the node 61 which is sitting at Vdd-Vt: where Vt is the threshold of the transistor 60.

Then, at the actual transition of the reference signal to its negative value (see FIG. 2), waveform A will drop steeply thereby quickly shutting off the transistors 53 and 58. Waveform B begins to ramp up to slowly turn on the transistors 54 and 64, waveform D will jump up sharply to turn off the transistor 56, and finally after a short delay, the waveform C will ramp down to turn on the transistor 52.

This initiates the charging of the capacitor 20. Then, as its charging becomes complete just prior to the positive transition of the reference signal, the just described charge/discharge cycle of the capacitor 20 will begin to repeat itself.

Now, the charge/discharge networks 24 and 26 are symmetrical and thus, charging and discharging of the capacitor 22 is quite similar to that described in regard to the capacitor 20. Of course, different transistors and alternate waveforms are employed as can be understood from the prior description of the charge and discharge paths for these capacitors.

In any event, upon discharge of first one and then the other capacitor, a rippled current will flow in the transistor 60, and in turn, is reflected in the transistor 88 and the node 90 of the filter network 16. Understandably, a conventional filter can be coupled to the node 90 to smooth the rippled current flowing through this node from the switched capacitor circuit 14.

Prior to describing the falter network 16, it should first be noted that the transistor 54, provided in parallel to the charging transistor 52, contributes two important aspects to the charged/discharge network 24. Firstly, in the charging step, the N-type transistor 54 rises quickly, as compared to the P-type transistor 52, so as to rapidly bring the node 48 up. Thus, the transistor 54 quickly brings the node 48 to the level of the voltage source, Vdd, minus the threshold voltage of the transistor 54. Then, the p-type transistor 52 takes over, and brings this node the rest of the way up to Vdd. Additionally, in the discharge step, the transistor 54 also holds the node 48 from turning slightly negative which can occur due a parasitic diode (not shown) in the grounding transistor 53. This diode will sometimes form, depending on the manufacturing process, at the drain to substrate of the transistor 53 when this transistor is turned on. The parasitic diode of the transistor 53 can be coupled a little bit negative due to a negative transient on its gate. Thus it is desirable to design the grounding transistor 53 to have a low enough capacitance that it does not forward bias any diode.

However, if the node 48 did tend to go negative due to current from the indicated diode, that current would also tend to bias the drain of the transistor 54 negative. Thus, the transistor 54 would absorb any such current. Consequently, when the transistor 53 is turned on, the transistor 54 stands ready to absorb any current from the parasitic diode of the former.

As can be appreciated, if the current from this parasitic diode is not absorbed, it will modify the charged state of the capacitor 20. Consequently, the amplitude of the charge on the capacitor would vary from the predicted value from circuit to circuit, and the output current of the circuit 10 would also vary accordingly.

The same two aspects of quick start up and absorption of parasitic diode current holds true for the transistor 58. That is, in each discharging step for the capacitor 20, the N-type transistor 58 rises quickly so as to initially bring the node 50 up. Then, the p-type transistor 56 takes over, and brings the node 50 the rest of the way. On the other hand, in each charging step, the transistor 58 holds the node 50 from turning slightly negative due any parasitic diode of the transistor 64.

Thus, the charge the charge/discharge circuit 24 includes at least one charging transistor 52 coupled from the voltage source Vdd to one electrode 49 of the capacitor 20 and a grounding transistor 64 coupled between the other electrode 51 of this capacitor and ground, and the discharge path includes at least one discharging device 56 coupled from the voltage source Vdd to the electrode 51 and one grounding device coupled between the electrode 49 and ground, and these paths each further include transistors 54, 58 coupled in parallel to each of said transistors 52, 56, respectively, for rapidly initiating the charging and discharging of the capacitor 20 and for precluding changes in the state of charge or discharge of this capacitor due to parasitic diodes of the grounding transistors 53, 64.

Stated otherwise, the transistors 54 and 58 provide means for rapidly initiating the charging and discharging, respectively, of the capacitor 20, and also for respectively precluding changes in the charged and discharged state of this capacitor due to parasitic diodes in a conductive device in the ground side of the charge and discharge paths. Further, since the switched capacitor circuit 14 is symmetrical with regard to the capacitors 20 and 22, the just noted operation of the transistors 54 and 58 equally apply to the transistors 74 and 78 in the charge/discharge network 26.

It is also of some importance that the threshold of the transistor 60 be dominant in the discharge cycle so as to maximize the current flow in this transistor and its reflection in the mirror circuit of the transistor 88. To ensure this control, the P-type transistor 56 is designed as a weak transistor in parallel to the N-type transistor 58, thereby ensuring that the threshold of the transistor 60 will prevail. Stated otherwise, the weak transistor 56 helps the transistor 58 to raise the voltage on the node 50 above the voltage threshold of the latter, and thus, removes any influence of its threshold on the final discharged state of the capacitor 20.

In the filter network 16, the current waveforms (not shown) flowing in the transistor 88 and the node 90 are identical on alternate half cycles. For example, on one half cycle of the reference signal, the current in the transistor 60, which is reflected in the transistor 88, is due to current being discharged in the capacitor 20. This current flow will rise and then decay back to just about zero. Then, on the next half cycle, the transistor 88 reflects the current from the capacitor 22, which current also rises and decays in substantially identical fashion.

The just described current in the transistor 88 and the node 90, flows from the latter through a transistor 92 to a node 94. It then continues to a capacitor 96 and ground. A transistor 98 is connected from the node 94 to ground in parallel to the capacitor 96. The gate 99 of the transistor 98 is also coupled to the node 94, and acts a clamp to hold this node above a threshold. This transistor 98 in conjunction with the capacitor 96 provide a first stage of the filter 16 and carries a current that is the average of the total current flowing in the capacitors, but would have a ripple.

A high resistance, N-type FET transistor 100 is connected between the node 94 and a node 104 with its gate 102 directly connected to the voltage supply whereby, this transistor is always On. The node 104 drives a transistor 108 and in turn, is coupled to ground through a capacitor 106. Since the transistor 100 is designed to be a high resistance, it forms an RC filter with the capacitors 96 and 106.

Consequently, in going from the node 94 through the resistor 100 to node 104 there is a further filtering of the waveform. In fact, the current in the transistor 108 would look like a DC current level such that the filtering is substantially complete. Thus, the transistor 108 then holds a steady current and would be a reflection of the current in the transistor 98.

The current in the transistor 108 is delivered as a voltage to an output terminal 120. The actual voltage is determined by the size of the transistor chosen for the transistor 111. The output of the circuit 10 is intended to drive other P-type FETs which would be the loads, and these loads (not shown) would carry a current proportional to that of the transistor 111.

One further aspect is that a pair of transistors 110 and 112 are connected in parallel between the voltage supply and a pair of serially connected transistors 114 and 116 in order to provide biasing for a transistor 118. The latter in turn, provides a cascade stage for the transistor 108. This stage holds the voltage on the drain 109 of the transistor 108 at a constant value to thereby make the current more independent of the load. Stated otherwise, since this provides a further current mirror, the current delivered to the output terminal 120 will be more independent of the supply voltage Vdd.

This completes the description of the preferred embodiments of the invention. Since changes may be made in the above structure and process without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. A switched capacitor current source operable from a voltage source in accordance with alternating polarities of a reference signal, said current source comprising:

a non-linear capacitor comprising an accumulation capacitor, said accumulation capacitor being an FET transistor comprising a semiconductor device having an N-type region, a gate overlying at least a portion of said N-type region, a thin insulative layer interposed between said portion of said region and said gate, and an electrical connection to said N-type region whereby said electrical connection in conjunction with said portion of said N-type region forms a first electrode of said capacitor and said gate forms the second electrode of said capacitor; and switching means coupled to said capacitor for charging said capacitor from said voltage source, in response to one polarity of said reference signal, and for then discharging said capacitor, in response to the other polarity of said reference signal.

2. The invention of claim 1 wherein said switching means includes:

a first conductive device having a given threshold voltage coupled between said capacitor and a source of voltage; and charging and discharging means coupled to said capacitor for charging said capacitor to a value substantially equal to the level of said voltage source and for then discharging said capacitor through said first conductive device to a value equal and opposite to the level of said voltage source minus said given threshold voltage.

3. A switched capacitor current source operable from a voltage source in accordance with alternating polarities of a reference signal, said current source comprising:

a non-linear capacitor;

switching means coupled to said capacitor for charging said capacitor from said voltage source in response to one polarity of said reference signal, and for then discharging said capacitor in response to the other polarity of said reference signal;

said switching means including a first conductive device having a given threshold voltage coupled between said capacitor and a source of voltage, and charging and discharging means coupled to said capacitor for charging said capacitor to a value substantially equal to the level of said voltage source and for then discharging said capacitor through said first conductive device to a value equal and opposite to the level of said voltage source minus said given threshold voltage; and said charging and discharging means includes:

a charge path having a charging device, operable in response to a given polarity of said reference signal, coupled between said voltage source and one electrode of said capacitor and a first grounding device coupled between ground and the other electrode of said capacitor;

a discharge path having a discharging device, operable in response to the opposite polarity of said reference signal, coupled between said voltage source and said other electrode, and a second grounding device coupled between ground and said one electrode;

said charge path including another device, operable in response to a given polarity of said reference signal, coupled in parallel to said charging device for rapidly initiating the charging of said capacitor and for precluding changes in the state of charge thereof due to the parasitic diode of said second device; and said discharge path including another device, operable in response to the opposite polarity of said reference signal, coupled in parallel to said discharging device for rapidly initiating the discharging of said capacitor and for precluding changes in the state of discharge thereof due to the parasitic diode of said first device.

4. The invention of claim 3 wherein said charging device and said discharging device are both P-type FET transistors, and each of said another devices are N-type FET transistors.

5. A switched capacitor current source operable from a voltage source in accordance with the alternating polarities of a reference signal, said current source comprising:

a non-linear capacitor, said non-linear capacitor being an FET transistor comprising a semiconductor device having an N-type region, a gate overlying at least a portion of said N-type region, a thin insulative layer interposed between said portion of said region and said gate; and an electrical connection to said N-type region whereby said electrical connection in conjunction with said portion of said N-type region forms a first electrode of said capacitor and said gate forms the second electrode of said capacitor;

a first conductive device, having a given threshold voltage, coupled between said capacitor and a source of voltage; and switching means for charging said capacitor in a forward direction, in response to one polarity of said reference signal, to a value substantially equal to the level of said voltage source and for then charging said capacitor in a reverse direction, in response to the other polarity of said reference signal, through said first conductive device to a value equal to and opposite to that of said voltage source minus said given threshold voltage.

6. A switched capacitor current source operable from a voltage source in accordance with the alternating polarities of a reference signal, said current source comprising:

an FET capacitor having an N-type region, a gate overlying at least a portion of said N-type region, a thin insulative layer interposed between said portion of said region and said gate, and a first electrical connection to said N-type region and a second electrical connection to said gate whereby said portion of said N-type region forms a first electrode of said capacitor and said gate forms the second electrode of said capacitor; and switching means coupled to said capacitor for alternately charging and discharging said capacitor from said voltage source in response to said alternating polarities of said reference signal, said switching means including a charge path having a first charging transistor coupled between said voltage source and said one electrode of said capacitor and a first grounding transistor coupled between ground and the other electrode of said capacitor, and a discharge path having a first discharging transistor coupled between said voltage source and said other electrode of said capacitor and a first grounding transistor coupled between ground and said other electrode of said capacitor.

7. The current source of claim 6 wherein said charge path further includes a second charging transistor coupled in parallel to said first charging transistor and configured for precluding changes in the charged state of said capacitor due to the parasitic diode of said second grounding transistor, and said discharge path further includes a second discharging transistor coupled in parallel to said first discharging transistor and configured for precluding changes in the discharged state of said capacitor due to the parasitic diode of said first grounding transistor.

8. The current source of claim 7 wherein said first charging transistor is a P-type transistor, said second charging transistor is an N-type transistor arranged in parallel to said first charging transistor and in connection to one electrode of said capacitor so as to preclude any said change in the charged state thereof due to the parasitic diode of said second grounding transistor, said first discharging transistor is a P-type transistor, and said second discharging transistor is an N-type transistor arranged in parallel to said first discharging transistor and in connection to the other electrode of said capacitor so as to preclude any said change in said discharged state thereof due to the parasitic diode of said first grounding transistor.

9. A switched capacitor current source operable from a voltage source in accordance with alternating polarities of a reference signal, said current source comprising:

an FET capacitor adapted and configured for charging to a value substantially equal to the level of the voltage source and for discharging, through a conductive device of given threshold voltage, to a value equal and opposite to the level of the voltage source minus said given threshold voltage; and switching means, including a charge path and a discharge path, coupled to said capacitor for alternately charging and discharging it from the voltage source in response to the alternating polarities of the reference signal, said charge path having a first charging transistor coupled between the voltage source and one electrode of said capacitor and a first grounding transistor coupled between ground and the other electrode of said capacitor, said discharge path having a conductive device of given threshold voltage coupled to the voltage source, and a first discharging transistor coupled between said first conductive device and said other electrode of said capacitor and a second grounding transistor coupled between ground and said one electrode of said capacitor, said charge path further including a second charging device coupled in parallel to said first charging device for precluding changes in the state of charge of said capacitor due to the parasitic diode of said second grounding transistor, and said discharge path further including a second discharging device coupled in parallel to said first discharging device for precluding changes in the state of discharge of said capacitor due to the parasitic diode of said first grounding device.

* * * * *